United States Patent [19]

Davis

[11] Patent Number: 5,724,280

[45] Date of Patent: Mar. 3, 1998

[54] ACCELERATED BOOTH MULTIPLIER USING INTERLEAVED OPERAND LOADING

[75] Inventor: Timothy Don Davis, Arlington, Tex.

[73] Assignee: National Semiconductor Corporation, Santa Clara, Calif.

[21] Appl. No.: 521,792

[22] Filed: Aug. 31, 1995

[51] Int. Cl.[6] .................................................. G06F 7/52
[52] U.S. Cl. ............................................................. 364/760
[58] Field of Search ................................. 364/760, 758, 364/800; 395/800

[56] References Cited

U.S. PATENT DOCUMENTS

| | | | |
|---|---|---|---|
| 4,646,257 | 2/1987 | Essig et al. | 364/760 |
| 4,796,219 | 1/1989 | Williams | 364/758 |
| 5,220,525 | 6/1993 | Anderson et al. | 364/760 |
| 5,446,909 | 8/1995 | Intrater et al. | 395/800 |

OTHER PUBLICATIONS

Koren, Israel, "High-Speed Multiplication", *Computer Arithmetic Algorithms*, Chapter 6, pp. 99–106, Prentice Hall, Inc., 1993.

Short, Kenneth L., Microprocessors, *Microprocessors and Programmed Logic*, Second Edition, pp. 241–243, Prentice-Hall, Inc., 1987.

Taylor, Fred J., *Digital Filter Design Handbook*, pp. 578–581, Marcel Dekker, Inc., 1983.

Rabiner, Lawrence R. & Gold, Bernard, *Theory and Application of Digital Signal Processing*, pp. 514–524, Prentice-Hall, Inc., 1975.

Ohkubo, Norio et al., "A 4.4 ns CMOS 54×54-b Multiplier Using Pass-Transistor Multiplexer", *IEEE Journal of Solid-State Circuits*, vol. 30, No. 3, pp. 251–257, Mar. 1995.

Omondi, Amos R., *Computer Arithmetic Systems; Algorithms, Architecture and Implementations*, pp. 152 & 154, Prentice-Hall, 1994.

Patterson, David A., "Computer Arithmetic", *Computer Architecture A Quantitative Approach*, pp. A–1 thru A–10 & A–39 thru A–44, Morgan Kaufmann Publishers, Inc., 1990.

*Primary Examiner*—Paul P. Gordon
*Assistant Examiner*—Monica Lewis
*Attorney, Agent, or Firm*—Limbach & Limbach L.L.P

[57] ABSTRACT

A multiplier which uses Booth recoding to multiply large word length operands. A first operand is fully loaded into a shift register. The loading of the second operand is then begun, with the recoding operation beginning after the loading of the minimum number of bits of the second operand required for the first stage of the recoding. The loading of the second operand continues while the previously loaded portions of the operand are recoded and the partial products based on those recoded portions are generated and accumulated.

4 Claims, 6 Drawing Sheets

ACCELERATED BOOTH MULTIPLIER USING INTERLEAVED OPERAND LOADING

TECHNICAL FIELD

The present invention relates to architectures for large operand length multipliers, and more specifically, to an apparatus which implements the Booth multiplication algorithm in a faster manner than currently used multipliers by interleaving the loading of the operands with the recoding and partial product accumulation operations.

BACKGROUND OF THE INVENTION

Many data processing applications require that two operands be multiplied together. In particular, signal processing and data encryption applications depend on high speed multiplication operations, often with large word length operands.

The product of two operands is typically obtained through successive additions of shifted strings of bits, with each string representing an intermediate or partial product of one operand with a term from the other operand. The intermediate product terms are summed to obtain the final result. The product (P) of two operands (X and Y) can be represented as:

$$P = X \cdot Y = X \times \Sigma y_i r^i = \Sigma X \times y_i r^i \quad (1)$$

where $y_i$ is the value of the ith bit of the Y operand, r is the radix for the number system representation used, and the summation runs from i=0 to n−1, with n being the number of bits in the Y operand.

Equation (1) indicates that the multiplication operation is equivalent to the summing of n terms of the partial product ($X \times y_i r^i$). For a binary number representation system, the radix equals 2 and $y_i$ equals either 0 or 1. The ith term in the sum is then obtained by a left shift of operand X for i bit positions and multiplication by the digit $y_i$. The n terms are then summed.

Booth Recoding is a well known method for multiplying unsigned or two's complement numbers. The method is based on the observations that a string of zeros in an operand requires no addition of the partial product terms, just a shifting of the previous partial product, and that a string of ones in the multiplier extending from bit $2^p$ to $2^q$ (q>p) can instead be treated as the value $2^{q+1} - 2^p$. These observations have led to the development of a faster method for performing multiplication operations.

Booth's method is carried out by the following steps. Let $x_i$ be the ith bit of an n-bit multiplier X. Bit $x_{n-1}$ is the most significant bit and $x_0$ is the least significant bit. A bit $x_{-1}=0$ is assumed in order to provide closure of the method. The multiplicand is Y. Starting with i=0, bits $x_i$ and $x_{i-1}$ of the multiplier are compared. Based on the comparison, the indicated action is performed:

| $x_i$ | $x_{i-1}$ | Action |
|---|---|---|
| 0 | 0 | Shift Y left with respect to partial product |
| 0 | 1 | Add Y to partial product, then shift Y |
| 1 | 0 | Subtract Y from partial product, then shift Y |
| 1 | 1 | Shift Y |

This process is repeated until n comparisons are completed. The result is the product of the two operands.

The above description of Booth's method is based on comparing two bits of one of the operands at a time. If a higher radix value is used, extensions of the method can be made to comparisons of three or more bits. This will further increase the speed with which the multiplication operation is implemented. For example, given two operands expressed as base 4 (modulo 4) numbers, then if three bits of the multiplier X are examined during each comparison, the multiplicand terms to be added or subtracted are 0, Y, −Y, 2Y, and −2Y. The table below shows the appropriate factor to add based on a comparison between bits i+1, i, and i−1 of the multiplier operand X:

| Current Pair | | Previous Bit | |
|---|---|---|---|
| i+1 | i | i−1 | Factor |
| 0 | 0 | 0 | 0 |
| 0 | 0 | 1 | +Y |
| 0 | 1 | 0 | +Y |
| 0 | 1 | 1 | +2Y |
| 1 | 0 | 0 | −2Y |
| 1 | 0 | 1 | −Y |
| 1 | 1 | 0 | −Y |
| 1 | 1 | 1 | 0 |

Figure 1:
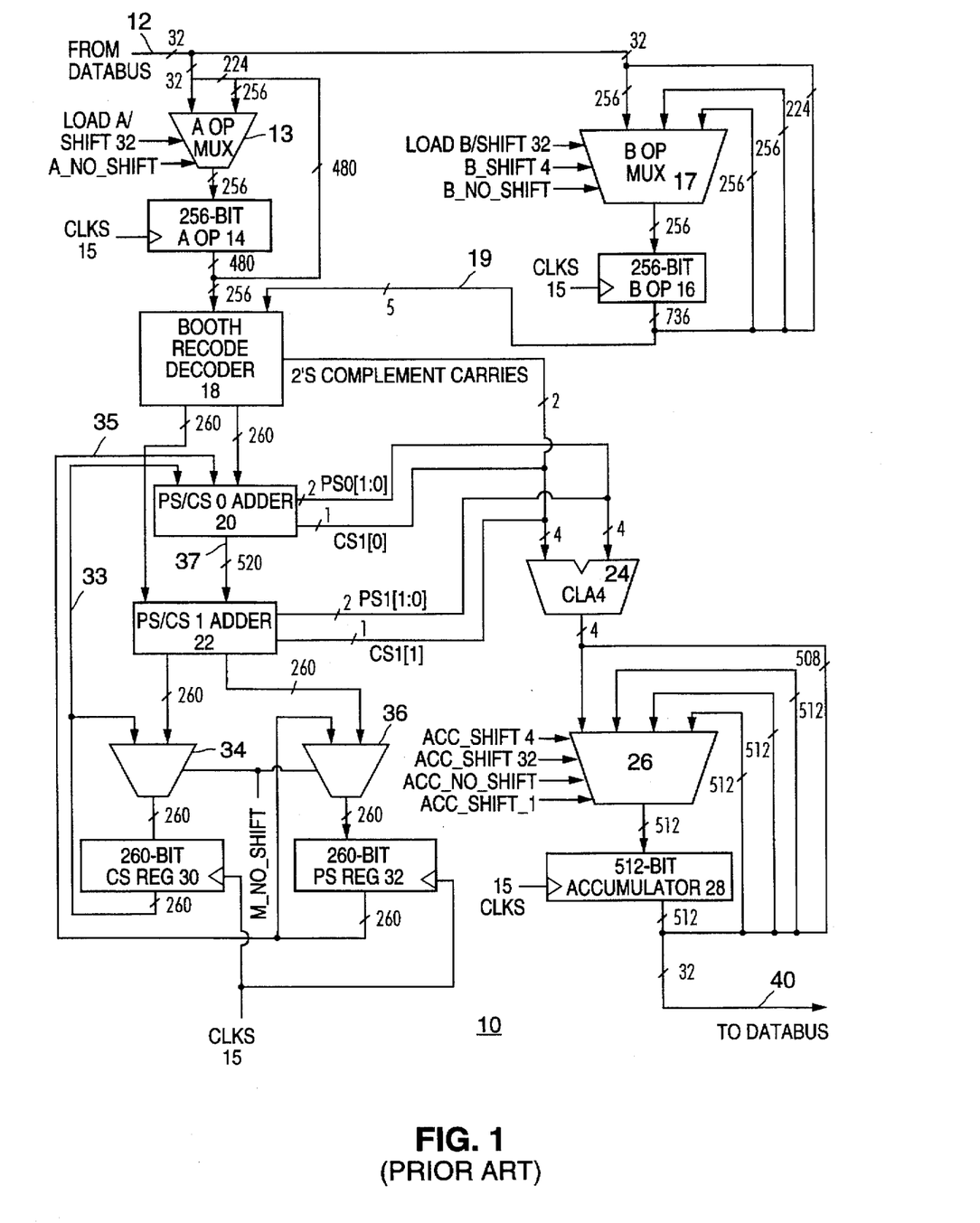
FIG. 1 is a block diagram of a prior art circuit for a multiplier which uses Booth's recoding method to perform the multiplication of two operands.

FIG. 1 is a block diagram of a prior art circuit for a multiplier 10 which uses Booth's recoding method to multiply two operands. The multiplication operation executed by multiplier 10 can be described in terms of three processing stages. During the first stage, data representing operands A and B is loaded. During the second stage, operand B is shifted in groups of bits (where each group contains 4 different bits in the case of a modulo 4 recoder) into a Booth recoder, the operand is recoded, and the resultant partial product terms are formed and accumulated. The accumulation phase produces partial sum and carry save data for the sums of the partial products. This stage produces 4 bits of the final product per clock cycle by using a 4 bit carry look ahead adder to combine the least significant bits of the partial products. The final product data is stored in a 512 bit accumulator. The stage continues until all of operand B has been recoded (256 bits in the case of this example), with the 256 bits of final product data generated forming the 256 least significant bits of the final result. In the final stage, the final partial sum and carry save data is added together to produce the 256 most significant bits of the final result. The circuit elements used to implement each of the three stages will now be described.

The data representing operands A and B is input by means of 32 bit data bus 12. The multiplicand operand A data is retrieved from bus 12 and loaded into 256 bit shift register 14, in 32 bit groups, one group with each clock cycle, where clock signal (CLKS) 15 controls the loading of the 32 bit data groups. As operand A is 256 bits in size in this example, 8 clock cycles are required to complete loading it into register 14.

Operand A multiplexer 13 is used to control the loading of data into register 14, and in particular, to maintain the register in an idle state after the operand A data has been loaded and the other operations of the multiplier are being executed. Multiplexer 13 has two inputs: a first input signal which instructs the multiplexer to load operand A data, shifting 32 bit wide groups of operand A data into register 14; and a second input signal which instructs the register not to shift the data being loaded. The no-shift control signal is used during the clock cycles after operand A has been fully loaded in order to maintain the entire operand A data in the register. This capability is needed because clock signal 15 is continuously provided to register 14, which causes the contents of the register to be shifted out with each clock cycle. Therefore, multiplexer 13 is used to provide an idle state so that the data flow into register 14 is properly coordinated with the multiplication stages. In this case, multiplexer 13 and a feedback loop are used to maintain the full 256 bit operand A data in the register for use with the Booth recoding process while clock signal 15 is clocking the register.

Operand A multiplexer 13 decodes the load operand A data, the shift 32 bit wide data groups, and no shift input signals so that the 32 bit shifted data groups of the 256 bit input or the non-shifted 256 bit input to the multiplexer are connected to the multiplexer output. The data shifting function is obtained in a known manner by means of the connections between the multiplexer and register 14. The control signals for selecting which function is implemented by multiplexer 13 are provided by an external sequencer or state machine (not shown) in accordance with the phase of the multiplication operation being executed.

After all of the operand A data has been loaded, multiplier operand B is then loaded in 32 bit groups into 256 bit shift register 16, where register 16 is controlled by clock signal CLKS 15. Operand B multiplexer 17 is used to control the functioning of continuously clocked register 16 in accordance with the stage of the multiplication operation being carried out. Multiplexer 17 has three inputs: a first input signal which instructs the multiplexer to load the operand B data, shifting 32 bit wide groups of the data into register 16; a second input signal which instructs the register not to shift the data and which is used to produce an idle state; and a third input signal which instructs the register to shift the operand B data out of the register in groups of 4 bits. As in the case of multiplexer 13, the control signals for selecting which function is implemented by multiplexer 17 are provided by an external sequencer or state machine in accordance with the phase of the multiplication operation being executed. As operand B is 256 bits in size in this example, 8 clock cycles are required to complete loading it into register 16. Thus, in this example, a total of 16 clock cycles are required to load operands A and B into their respective registers. Furthermore, because of the design of this multiplier, the operands must be fully loaded before the Booth recoding process can begin.

The operand B data is shifted out of register 16 in 4 bit groups because application of Booth's method using a two stage modulo 4 recoder (as in the present example) requires 4 bits of operand B for each recoding operation. The 4 bit groups of operand B data are transferred to Booth Recode Decoder module 18 by means of data bus 19. Booth Recode module 18 evaluates multiplier operand B in successive bit fields to determine what factor of multiplicand operand A to use in forming the partial product terms which are added together to obtain the final product. Since Booth module 18 is a two stage recoder, 2 successive bit fields are recoded during each clock cycle. Each bit field recoding produces two least significant bits of an uncorrected result for the final product and a modulo 4 carry term. Booth module 18 thus produces 4 least significant bits of uncorrected final product data and 2 modulo 4 carry bits per clock cycle. As operand B is 256 bits long in this example, it takes approximately 64 clock cycles (256 bits/4 recoded bits per cycle) to recode the entire operand.

The result of the recoding operation is a control signal which instructs Booth module 18 to select the appropriate factor of operand A (0, A, −A, 2A, or −2A) to use in forming the partial product terms. Since two recode stages are used in Booth recoder 18 of this example, Booth recoder 18 outputs two factors of operand A each clock cycle.

One factor of operand A serves as an input to Partial Sum/Carry Save (PS/CS) Adder Array 0 20, while the second factor of operand A serves as an input to Partial Sum/Carry Save (PS/CS) Adder Array 1 22. Thus, as each group of 4 different bits of operand B is recoded during a clock cycle, two factors of operand A are selected and transferred to adders 20 and 22.

Each of the two PS/CS adders 20 and 22 produces a 260 bit partial sum and a 260 bit partial carry term. As each of the 260 bit wide partial product terms (the factors of operand A) are provided to adders 20 and 22, they are added to the results of the previous addition operation performed by the adders. This results in a new partial sum term and a new carry save term. The two least significant bits of the partial sum term and the least significant bit of the carry save for each addition operation are provided to 4 bit full look ahead carry adder 24. As both adders 20 and 22 are generating partial sum and carry save terms during each clock cycle, two sets of least significant partial sum and carry save bits are provided to adder 24, for a total of 4 least significant bits of partial sum data and two bits of carry save data. This data is combined in adder 24 with the modulo 4 carry bit generated by each recoder stage of Booth recoder 18.

Adder 24 adds the 4 least significant bits of the partial sums produced by adders 20 and 22 during a clock cycle to the 2 carry save bits and the 2 bits of modulo 4 carry data provided by Booth recoder 18. This produces 4 bits of the final product term. Each 4 bit group of final product data produced by adder 24 is shifted into multiplexer 26 which loads 512 bit accumulator 28.

Multiplexer 26 has four different control signals as inputs: a signal which instructs accumulator 28 to shift the data input by 4 bits; a signal which instructs accumulator 28 to shift the data input by 32 bits; a signal which instructs accumulator 28 not to shift the data; and a signal which instructs accumulator 28 to shift the data by 1 bit. As adder 24 produces 4 bit groups of the final product, multiplexer 26 controls the loading of accumulator 28 with the data by shifting the data by 4 bit increments. When operand B is completely recoded and the partial products accumulated, the lower 256 bits of 512 bit accumulator 28 will be filled. The shift data by 32 bits function is used to dump the accumulator data to data bus 40. As discussed previously, the no shift function is used to implement an idle state in which the data is continually clocked back into accumulator 28. This function is needed because the accumulator registers are continuously clocked and the accumulator function is not utilized during all stages of the multiplication operation. The shift data by 1 bit function is used to provide a term of the form 2*(A*B) for use in computing the terms in the square of the sum of two operands.

After all of operand B has been recoded, the appropriate factors of operand A have been added in adders 20 and 22, and the partial sum and carry save data for each cycle has been transferred to adder 24, registers 30 and 32 contain the most significant bits of the carry save operations performed on the operand A factors. CS register 30 is 260 bits in size and is clocked by clock signal 15. PS register 32 is 260 bits in size and is similarly clocked by clock signal 15. The contents of CS register 30 and PS register 32 are used to implement the final addition operation which produces the upper 256 bits of the final product. CS shift register 30 and PS shift register 32 are loaded under the control of multiplexers 34 and 36, respectively.

The final addition stage is performed using the same adders as were used to produce the lower 256 bits of the final product. The contents of registers 30 and 32 are fed back into adder 20 by means of data busses 33 and 35, with adder 20 transferring data to adder 22 by means of data bus 37. As operand B has been completely recoded, operand B register 16 contains all zeros. Thus, the adders are performing an operation equivalent to (A*0+CS+PS). After adders 20 and 22 are loaded with the contents of registers 30 and 32, the multiplier unit is cycled through the 64 cycles normally required to accumulate the partial products. However, because in this situation operand B is zero, the effect of the cycling is to add the contents of registers 30 and 32.

The result is that during each cycle, the 2 least significant bits from each of adders 20 and 22 are added together in 4 bit adder 24 to produce a 4 bit group of the most significant bits of the final product. Each 4 bit group of the most significant bits of the final product is loaded into 512 bit accumulator 28 using the 4 bit shift instruction of multiplexer 26. After accumulator 28 is loaded with the 256 most significant bits of the final product term, the multiplication operation is complete. The data is clocked out of accumulator 28 in 32 bit groups and placed on data bus 40.

In the multiplier of FIG. 1, operands A and B must be completely loaded into registers 14 and 16 before the Booth recoding operations are commenced. Given a data bus of width d which can transfer d bits per clock cycle, if the operands are m bits long, then this design requires 2m/d clock cycles to transfer the operands into the registers. This means that 16 clock cycles are required to load two 256 bit operands into their respective registers, assuming the operands are loaded 32 bits at a time. This delays the start of the operand processing until the completion of the 16 clock cycles, thus slowing down execution of the multiplication operation.

The multiplier design of FIG. 1 is typical in that it uses carry-save addition and registering to minimize circuitry and increase the multiplication rate. High speed multiplication and exponentiation operations require large Booth adder arrays having large partial sum and partial carry registers. Multiplying two m bit operands using a radix 4 Booth recoding multiplier requires approximately m/(2n) clock cycles to generate the least significant half of the final product, where n is the number of Booth recoder adder stages. The number of Booth recoder adder stages is equal to the number of bit groups which are recoded during a single clock cycle. After these m/(2n) cycles, the most significant upper half of the product is obtained by summing the contents of the partial sum and partial carry registers. As noted, this final addition is typically executed using the same Booth adders as were used to accumulate the partial products and carry terms in the previous stages of the multiplication operation.

Another aspect of the multiplier design of FIG. 1 relates to the manner in which it performs exponentiation operations which are often used in encryption applications. It is well known that exponentiation operations can be accelerated by performing squaring operations. Thus, in some cases it is desirable to efficiently calculate the terms in the expression for the square of the sum of two operands. The multiplier of FIG. 1 typically performs a squaring operation of the sum of operands A and B (where $[A+B]^2 = A^2 + 2AB + B^2$) by adding the product term A*B twice to the accumulator. Thus, this type of multiplier calculates the intermediate term in the form (A*B)+(A*B). Another method of calculating the 2AB term is to form the A*B product term and then shift the term by one bit in accumulator 28 to form the 2*(A.B) term.

Another feature of the multiplier of FIG. 1 is that a single clock signal is used to control the shifting of data into shift registers 14, 16, 30, and 32, and accumulator 28. Thus, all data loading and processing functions for the multiplication operation are continuously clocked by a common clock signal, with multiplexers used to produce an idle state so as to maintain the status of the registers after the data has been loaded. As this design uses synchronously clocked circuitry, power consumption is dependent upon the clock frequency. Since a high clock frequency is desirable for fast processing operations, this feature results in a high level of power consumption.

What is desired is a multiplier using the Booth recoding method which is implemented in a faster architecture than currently used multipliers which require the complete loading of both operands prior to the Booth recoding operations. These and other advantages of the present invention will be apparent to those skilled in the art upon a reading of the Detailed Description of the Invention together with the drawings.

SUMMARY OF THE INVENTION

The present invention is directed to a multiplier which uses Booth recoding techniques to multiply large word length operands. The architecture of the multiplier is such that it implements the multiplication operation in a faster and more efficient manner than typical architectures used for the same purpose.

A first operand is fully loaded into a shift register. The loading of the second operand is then begun, with the recoding operation beginning after the loading of the minimum number of bits of the second operand which are required for the first stage of the recoding. The loading of the second operand continues while the previously loaded portions of the operand are recoded and the partial products based on those recoded portions are generated and summed.

The recoded portions of the second operand are used to select the factor of the first operand to use in forming the partial product terms. The partial product terms are added using carry save addition, with the least significant bits being used to form the least significant bits of the final product. The most significant bits of the final product are then formed by adding the partial sum and carry save data from the partial product summations.

The multiplier performs squaring operations used in exponentiation functions by shifting the first operand value (A) by one bit to form twice that value (2*A) prior to multiplying by the second operand (B) to form the 2*(A*B) term needed in such calculations. This shifting is performed in the multiplexer used to select the appropriate factor of the first operand for each partial product term, rather than after the accumulation of the final product term.

The clock signals used to control the data processing operations and flow of data through the registers and adders are gated so that those registers which are needed for the stage of the multiplication operation being executed are clocked, while the other registers are not enabled. This reduces the power consumed during the multiplication operation when compared to an architecture in which a common clock signal is used to synchronously clock the circuitry. The result is a multiplier design which is faster, conserves power, and requires less circuitry than present multipliers based on the Booth recoding method.

Further objects and advantages of the present invention will become apparent from the following detailed description and accompanying drawings.

DETAILED DESCRIPTION OF THE INVENTION

Figure 2:
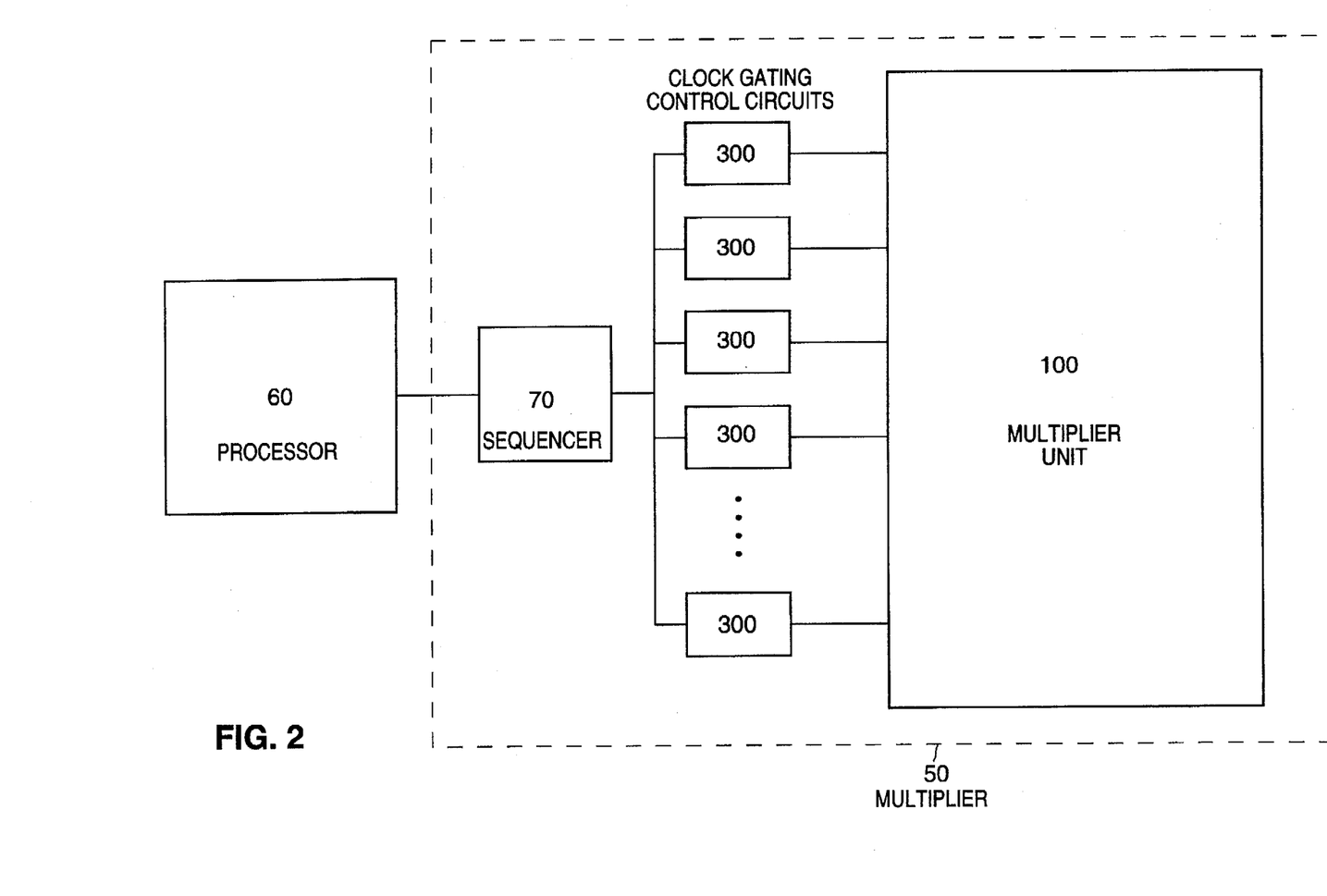
FIG. 2 is a block diagram of the 256 bit by 256 bit Booth Multiplier of the present invention.

FIG. 2 is a block diagram of the 256 bit by 256 bit Booth Multiplier 50 of the present invention. Multiplier 50 includes state controller or sequencer 70 which receives input commands from processor 60 instructing multiplier 50 to execute one of several basic multiplication functions. State controller 70 outputs control signals used to generate clock signals which clock the various components of multiplier unit 100. The clock signals are generated in a manner which implements the clock gating features of the present invention.

Upon receipt of an input command, state controller 70 produces signals to enable the various data processing functions which are carried out in executing the desired multiplication function. This is accomplished by using a sequencer which counts system clock cycles and outputs function enable signals at the appropriate times, in accordance with the number of cycles required for each stage of the data processing executed by multiplier unit 100. The function enable signals are provided to a set of clock gating control circuits 300. Control circuits 300 output function clock signals which are used to clock a register or other component of multiplier 100 which performs a particular stage of the multiplication operation.

As noted, the combination of the function enable signals produced by sequencer 70 and the actions of control circuits 300 are used to provide clocking signals for the various components of multiplier unit 100. By turning the clock signals on and off in accordance with the stages of the multiplication operation, power can be conserved when compared to synchronously clocked architectures.

A listing of pseudo code describing the operation of state controller or sequencer 70 is attached to this application as an appendix. The pseudo code indicates the various function enable (and disable) signals produced by state controller 70 in terms of the number of system clock cycles and the stage of operation of the multiplication process.

Figure 3:
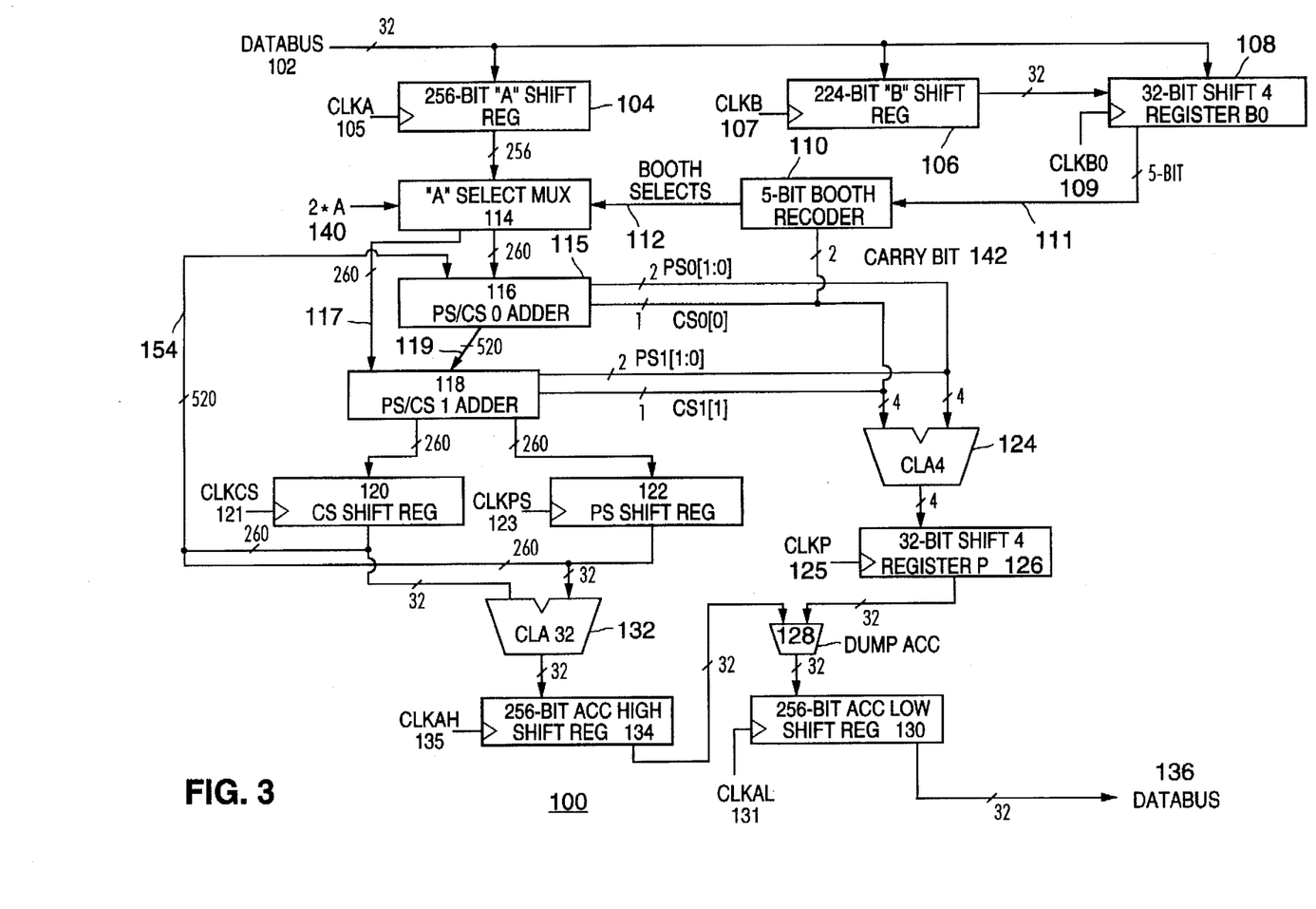
FIG. 3 is a block diagram of the multiplier unit of the 256 bit by 256 bit Booth Multiplier of the present invention.

FIG. 3 is a block diagram of the multiplier unit 100 of the 256 bit by 256 bit Booth Multiplier 50 of the present invention. The data representing operands A and B is input by means of 32 bit wide data bus 102. The multiplicand operand A data is retrieved from bus 102 and loaded into 256 bit shift register 104, with 32 bits being loaded with each clock cycle. Clock signal A (CLKA) 105 controls the loading of the 32 bit data groups for operand A into register 104.

As operand A is 256 bits in size, 8 clock cycles are required to complete its loading into register 104. Multiplier operand B could then be similarly loaded into a 256 bit shift register in the next 8 cycles as occurs in a typical multiplier design. However, the inventor of the present invention has recognized that application of Booth's method using a two stage recoder (as in the present invention) requires only the first 4 bits of the multiplier operand in order to begin the recoding operation. Thus, instead of waiting for operand B to be completely loaded into a 256 bit shift register, the first 32 bits of operand B are loaded into 32 bit shift 4 register 108, which is controlled by clock signal B0 (CLKB0) 109. These 32 bits are shifted out to the recoder in groups of 4 bits over the next 8 cycles of clock 109. This allows eight multiplication cycles to occur while the remaining 224 bits of operand B are loaded into 224 bit shift register 106, with clock signal B (CLKB) 107 controlling the loading of the 32 bit data groups of operand B into register 106.

By the time the remaining bits of operand B have been loaded into register 106, register 108 has finished shifting its original 32 bit group out to the recoder in groups of 4 bits. This allows the next 32 bit group of operand B to be loaded from register 106 into register 108 in accordance with clock signal B 107. The clock cycling continues as register 108 shifts the new B operand data out to the recoder in 4 bit groups upon receipt of each clock signal B0 109. This continues until register 108 is empty and the next 32 bit group is loaded from register 106 upon receipt of clock signal 107. This sequence repeats until all of the 224 bits loaded into register 106 have been shifted into register 108 and acted upon by the Booth recoder in the manner to be described.

Thus, the present invention accelerates the speed with which a Booth recoding based multiplication operation can be executed by interleaving the operand loading stage of the multiplier with the recoding and partial product accumulation stage. Instead of waiting 16 clock cycles to complete the loading of operands A and B prior to beginning the recoding stage, the present invention requires 8 clock cycles to load operand A, then 1 cycle to load the first 32 bits of operand B, and 1 further cycle (for a total of 10 clock cycles) to shift the first 4 bits of operand B out to the recoder. By interleaving the operand loading and recoding stages, the present invention achieves a significant reduction in the number of clock cycles required to perform the multiplication operation.

As noted, three clock signals, 105, 107, and 109 are used to control the loading of registers 104, 106, and 108. However, it is not necessary that all three clock signals be enabled and actively clocking the circuitry at the same time. Clock A signal 105 is needed for 8 cycles to complete the loading of register 104 with the bits of the A operand. During this time, both clock B signal 107 and clock B0 signal 109 do not need to be actively clocking their respective shift registers. Upon completion of the loading of the operand A bits, clock A signal 105 is not needed until the next multiplication operation when new operand A data will be loaded, and hence may be disabled. After loading of the 256 bit operand into register 104, clock B0 signal 109 is used to load the first 32 bits of operand B into register 108. This signal is then used to shift the 32 bits by 4 bits during each subsequent cycle of clock B0 signal 109. During the time clock B0 signal 109 is being used to shift the 32 bits loaded into register 108 out to the recoder in groups of 4 bits, clock B signal 107 is used to load the remaining 224 bits of operand B into register 106. Clock B signal 107 can then be turned off to the register. Thus, clock A signal 105 and clock B signal 107 can be turned off to their respective registers when those registers are not being loaded.

The multiplier of FIG. 3 uses control signals to determine when a clock signal should be active and clocking a register.

The clock control signals are generated as needed depending upon the status of the data being processed by the multiplier. By using multiple clocks whose signals are gated and used as needed, the power consumed by multiplier 100 can be reduced compared to multipliers which synchronously clock all of the circuitry using a common clock.

After the first 32 bits of multiplier operand B have been loaded into B0 register 108, the Booth partial product accumulation stage of the multiplication operation begins. As noted, during each cycle of clock B0 signal 109, 4 bits of the contents of register 108 are shifted out of that register to Booth Recoder module 110 by means of data bus 111. Booth Recoder module 110 evaluates multiplier operand B in successive bit fields to determine what factor of multiplicand operand A to use in forming the partial product terms which are added together to obtain the final product. Each bit field recoding produces two least significant bits of an uncorrected result for the final product and a modulo 4 carry term. The bit field evaluation is recoded according to the Booth method to determine whether a factor of either 0, A, −A, 2A, or −2A is used in the current partial product term.

Recoder module 110 consists of two three-bit Booth recoders cascaded together to form a modulo 4 Booth recoder. Each of the separate recoders examines three successive bits of multiplicand operand B, with the 3 bit fields overlapping by one bit. Thus, recoder module 110 examines 5 different bits of operand B during each cycle. As noted, each of the separate recoders produces 2 least significant bits of uncorrected product data and one bit of modulo 4 carry data per clock cycle, so that the two cascaded recoders together produce 4 least significant bits of product data and 2 carry bits per clock cycle.

Figure 4:
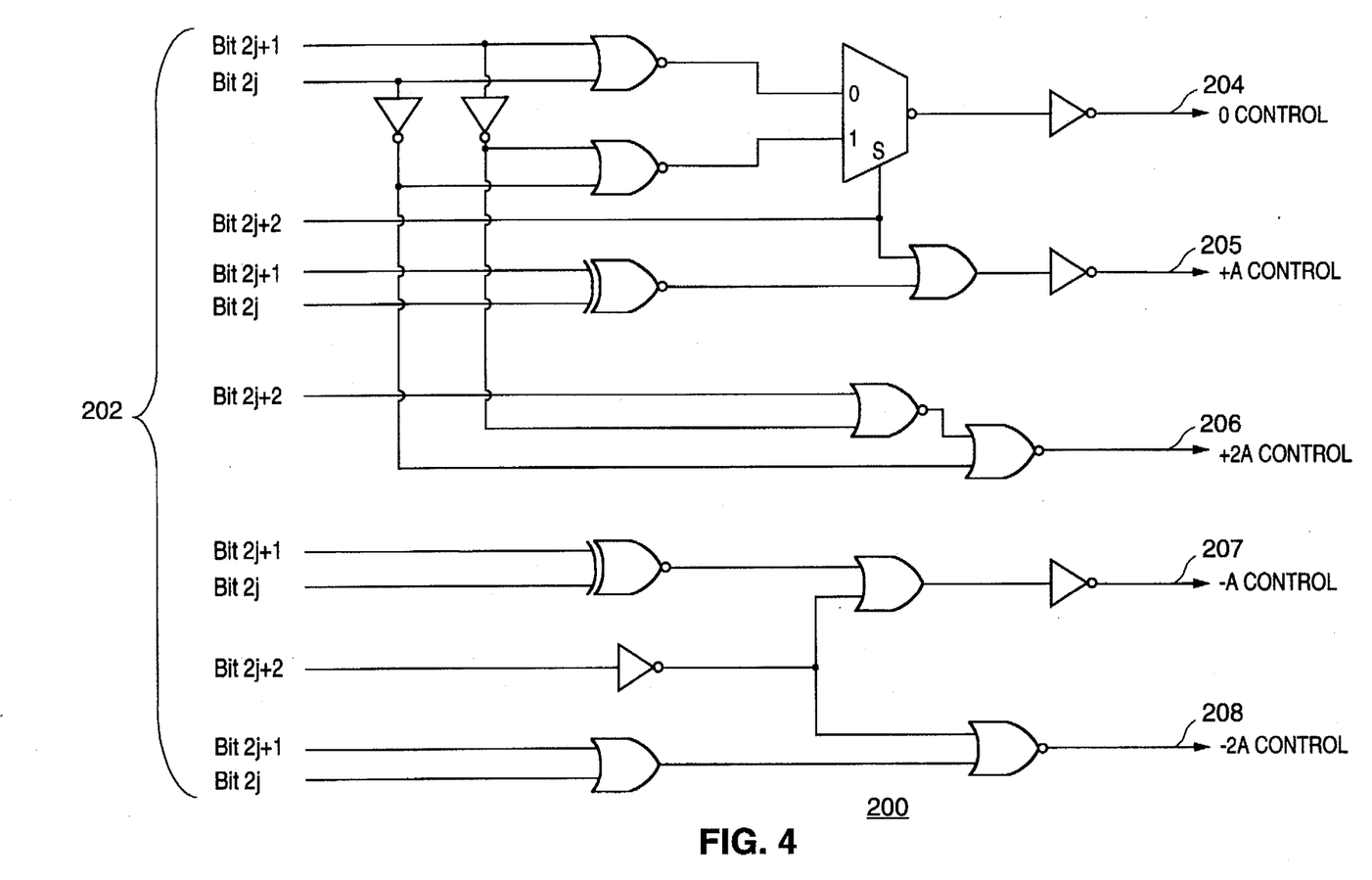
FIG. 4 is a schematic of the circuit of one of the two cascaded recoders contained in the Booth Recoder module of the multiplier unit of FIG. 3.

FIG. 4 is a schematic of the circuit of one of the two cascaded recoders 200 contained in Booth Recoder module 110 of multiplier unit 100. As indicated in the figure, recoder 200 has three inputs, labelled Yin<0>, Yin<1>, and Yin<2> 202. In accordance with the Booth method, the values of input bits 202 determine the output of recoder 200. This output is in the form of a control signal 112 (see FIG. 3) which instructs select multiplexer 114 to provide the factor of operand A used to form the partial product. Select multiplexer 114 responds to control signal 112 by producing the factor of operand A (obtained from register 104) required for the partial product term. These control signals 112 are shown individually in FIG. 4: signal 204 is used to add a factor of 0 to the partial product; signal 205 is used to add a factor of A; signal 206 is used to add a factor of 2A; signal 207 is used to add a factor of −A; and signal 208 is used to add a factor of −2A.

Recoder circuit 200 of FIG. 4 implements the following truth table based on a comparison of bits 2j+2, 2j+1, and 2j:

| Bit 2j + 2 | Bit 2j + 1 | Bit 2j | Add |
| --- | --- | --- | --- |
| 0 | 0 | 0 | 0 |
| 0 | 0 | 1 | +A |
| 0 | 1 | 0 | +A |
| 0 | 1 | 1 | +2A |
| 1 | 0 | 0 | −2A |
| 1 | 0 | 1 | −A |
| 1 | 1 | 0 | −A |
| 1 | 1 | 1 | 0 |

In the above table, the index j runs from 0 to 1, meaning that during each clock cycle, the three bit groups of bits 0, 1, 2 and bits 2, 3, 4 are recoded by the cascaded recoders. It is noted that figure depicts one example of a suitable circuit for recoder 200, and that other Booth recoder circuits may be used to implement the above truth table without departing from the spirit of the invention.

As noted, the output of Booth Recoder 110 is a control signal 112 which instructs select multiplexer 114 to use the appropriate factor of operand A to form the partial product. Since two recoders 200 are used in Booth Recoder 110, select multiplexer outputs two factors of operand A each clock cycle. Recode bits 0, 1, and 2 are used to generate the appropriate factor of A which serves as an input to Partial Sum/Carry Save (PS/CS) Adder Array 0 116 and which is transferred by means of data bus 115. Recode bits 2, 3, and 4 are used to generate the appropriate factor of A which serves as an input to Partial Sum/Carry Save (PS/CS) Adder Array 1 118 and which is transferred by means of data bus 117. Thus, as each group of 4 bits of operand B is recoded during a clock cycle, two factors of operand A are selected and transferred to adders 116 and 118.

Each of the two PS/CS adders 116 and 118 is a group of 260 one bit carry-save adders. This means that the carries of each adder are not immediately propagated to the higher sum bits to produce a single sum. Instead, the adders produce a 260 bit partial sum and a 260 bit partial carry. As each of the 260 bit wide partial product terms (the factors of operand A) are provided to adders 116 and 118, they are added to the results of the previous addition operation performed by the adders. The adders are connected in such a way that the new factors are appropriately shifted by 2 bits prior to their accumulation with the previous results. This is done in order to account for the fact that the input data is in modulo 4 format.

Each add operation results in a new partial sum term and a new carry save term. The two least significant bits of the partial sum term and the least significant bit of the carry save for each addition operation are provided to 4 bit full look ahead carry adder 124. As both adders 116 and 118 are generating partial sum and carry save terms during each clock cycle, two sets of least significant partial sum and carry save bits are provided to adder 124. This gives a total of 4 least significant bits of partial sum data and two bits of carry save data. This data is combined in adder 124 with the modulo 4 carry bit generated by each recoder stage in Booth recoder 110 which is transferred by means of data bus 142.

As noted, each clock cycle produces 4 bits of final product data after propagation of the operand A factors through PS/CS adders 116 and 118. These 4 bits of the product are obtained by combining the two sets of 2 partial sum bits and 1 carry save bit produced by the adders. Adder 124 adds the 4 least significant bits of the partial sums produced by adders 116 and 118 during a single clock cycle to the 2 partial carry bits and the 2 bits of modulo 4 carry data provided by recoder 110 to produce 4 bits of the final product. Note that the two bits of modulo 4 carry data from Booth recoder 110 are used by select multiplexer 114 to implement the two's complement subtraction function used in the recoding and partial product accumulation stage.

Each 4 bit group of final product data produced by adder 124 is shifted into 32 bit shift 4 register 126, which is controlled by clock P signal 125. Register 126 is used to combine the 4 bit groups of final product data into a 32 bit segment of final product data. This operation is performed in order to reduce the circuitry needed for shifting the product terms into the accumulator used to form the final product. It also increases the speed with which the final product is formed as compared to typical multiplier designs.

As each 32 bit of final product data is completed, it is shifted out of register 126 to accumulator multiplexer 128.

The contents of accumulator multiplexer 128 is then dumped into 256 bit accumulator 130 which represents the lower half of a 512 bit accumulator that will ultimately contain the final 512 bit product term resulting from the calculation carried out by the multiplier. Clock AL signal 131 is used to load accumulator 130 with the 32 bit sections of the final product obtained from 32 bit shift register 126 by way of accumulator multiplexer 128.

Figure 5:
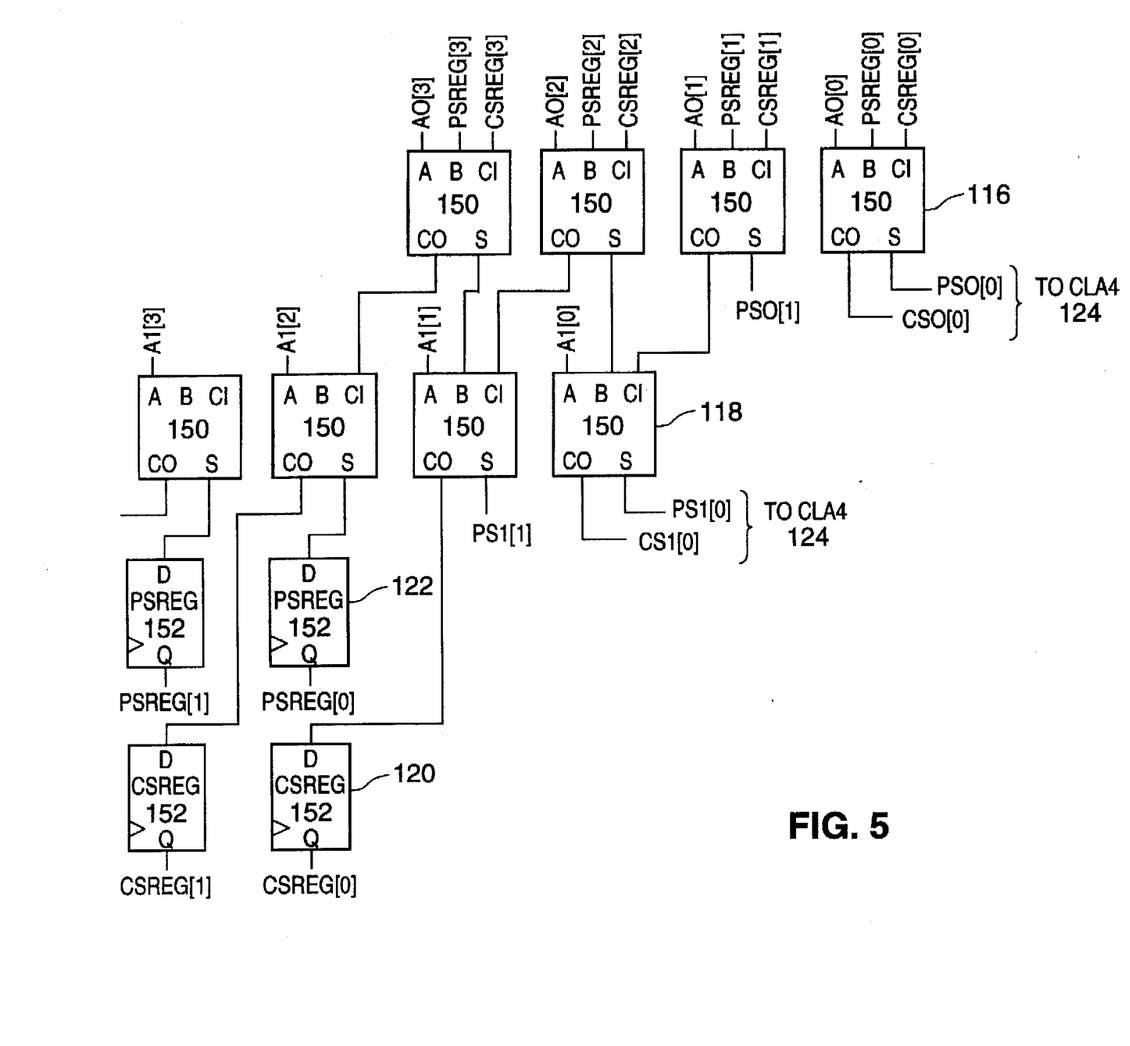
FIG. 5 is a diagram showing the connections between the adder arrays and the partial sum/carry save registers of the multiplication unit of the present invention.

FIG. 5 is a diagram showing the connections between the adder arrays and the partial sum/carry save registers of the multiplication unit of the present invention. The figure shows the data flow between the one bit carry-save adders of adder array PS/CS 0 116, the one bit carry-save adders of adder array PS/CS 1 118, CS register 120, and PS register 122. As shown in FIG. 5, each of adder arrays 116 and 118 are composed of a group of one bit carry-save adders 150. PS register 122 and CS register 120 are composed of a group of individual registers 152. It is noted that FIG. 5 shows only a portion of the full set of adders 150 and registers 152 contained in the multiplier.

Each one-bit adder 150 has inputs A, B, and CI (carry in bit) and outputs S (partial sum) and CO (carry out bit). The inputs to adder array 116 are the operand A factor corresponding to the recoded value of bits 0, 1, and 2 of the recoded section of operand B. This factor is shown as the term A0 in the figure, where A0[n] represents the nth bit of the term A0. The inputs to adder array 118 are the operand A factor corresponding to the recoded value of bits 2, 3, and 4 of the recoded section of operand B. This factor is shown as the term A1 in the figure, where A1[n] represents the nth bit of the term A1.

The appropriate bits of the factor of operand A are input as shown to the adders 150 of array 116. The other inputs to adders 150 of array 116 are the appropriate bits of PS register 122 and CS register 120. This implements a feedback loop between the PS and CS registers and adder array 116. This loop is used for the partial product accumulation function of the multiplier, and is indicated by data bus 154 in FIG. 3. One-bit adders 150 in array 116 and array 118 are staggered with respect to each other, with the inputs to the nth adder in array 118 being provided by the outputs from the n–2 th adder in array 116. This connection scheme implements the Booth recoding shift by 2 bits factor required when performing a modulo 4 based calculation.

As noted, the appropriate operand A factors are input to adder arrays 116 and 118. These factors are added to the results of the previous add operation, producing a new value for the partial sum and carry outputs. The least significant bits of the partial sum and carry out term produced by adder array 116 and adder array 118 (a total of 4 partial sum and 2 carry out bits) each cycle are provided to carry look ahead adder 124 for combination into the 4 bit sections of the final product term. The remaining partial sum outputs of adders 150 contained in adder array 118 provide the contents of PS register 122, while the remaining carry save outputs of adders 150 provide the contents of CS register 120. It is these terms which are provided to adder arrays 116 and 118 during the next cycle by means of the feedback connection between the registers and adder arrays.

After all of operand B has been recoded, the appropriate factors of operand A have been accumulated in adders 116 and 118, and the partial sum and carry save data for each cycle has been transferred to adder 124, registers 120 and 122 contain the most significant bits of the carry save operations performed on the operand A factors. CS register 120 is 260 bits in size and is clocked by clock CS signal 121, while 260 bit PS register 122 is clocked by clock PS signal 123. The contents of CS register 120 and PS register 122 are used to implement the final addition operation which produces the upper 256 bits of the final product.

When all of operand B has been recoded, accumulator 130 contains the lower 256 bits of the final product. The remaining bits of the final product are obtained by adding the contents of 260 bit CS register 120 to the contents of 260 bit PS register 122. This addition is performed by 32 bit carry look ahead adder 132. As each 32 bit wide set of data from registers 120 and 122 is added by adder 132 to produce a 32 bit group of the most significant bits of the final product, it is loaded into 256 bit accumulator 134 which represents the upper half of the 512 bit accumulator which will ultimately contain the final 512 bit product term. Clock AH signal 135 is used to load accumulator 134 with the 32 bit sections of the final product obtained from adder 132. When accumulator 134 has been filled, both the upper and lower 256 bit sections of the final product are complete.

The lower 256 bits of the final product are clocked out of accumulator 130 in 32 bit groups under the control of clock AL signal 131 and placed onto data bus 136. While the lower 256 bits are being placed onto the data bus, the upper 256 bits are being clocked out of accumulator 134 by clock AH signal 135 and placed in 32 bit groups into accumulator multiplexer 128. The 32 bit groups of the upper 256 bits are then passed to accumulator 130 as the lower bit groups are clocked out of that register. By the time the 256 lower bits of the final product have been clocked out of accumulator 130 and placed on bus 136, accumulator 130 has been refilled by the 32 bit groups of the upper 256 bits of the product formerly held in accumulator 134. The upper 256 bits are then clocked out of accumulator 130 and placed on data bus 136. In this way, all 512 bits of the final product are placed onto data bus 136 in 32 bit groups.

The multiplier of the present invention can be divided into three functional modules: 1) operand loading module, 2) Booth partial product calculation and accumulation module, and 3) accumulator shift function module which builds the final 512 bit product. As indicated in FIG. 3, each of the three stages is clocked independently of the others.

Clock signals 105, 107, and 109 are used to load the operands into shift registers 104, 106, and 108. Clock signals 121, 123, and 125 are used to calculate the Booth partial products and assemble the segments of the product term into the 256 bit upper and lower portions of the final product which are stored in registers 134 and 130. Clock signals 135 and 131 are then used to control the assembly of the final product term from the contents of registers 134 and 130.

In accordance with the present invention, the multiplication operation is accelerated by loading operand A into a register and beginning the Booth recoding and partial product accumulations after loading the first 4 bits of operand B. This is in contrast to multiplier designs in which the recoding stage is not begun until operand B is fully loaded. The present invention interleaves the loading of operand B with the recoding and partial sum accumulations to obtain a reduction in the number of clock cycles required for the execution of the operand loading and Booth recoding stages of the overall multiplication operation.

Figure 6:
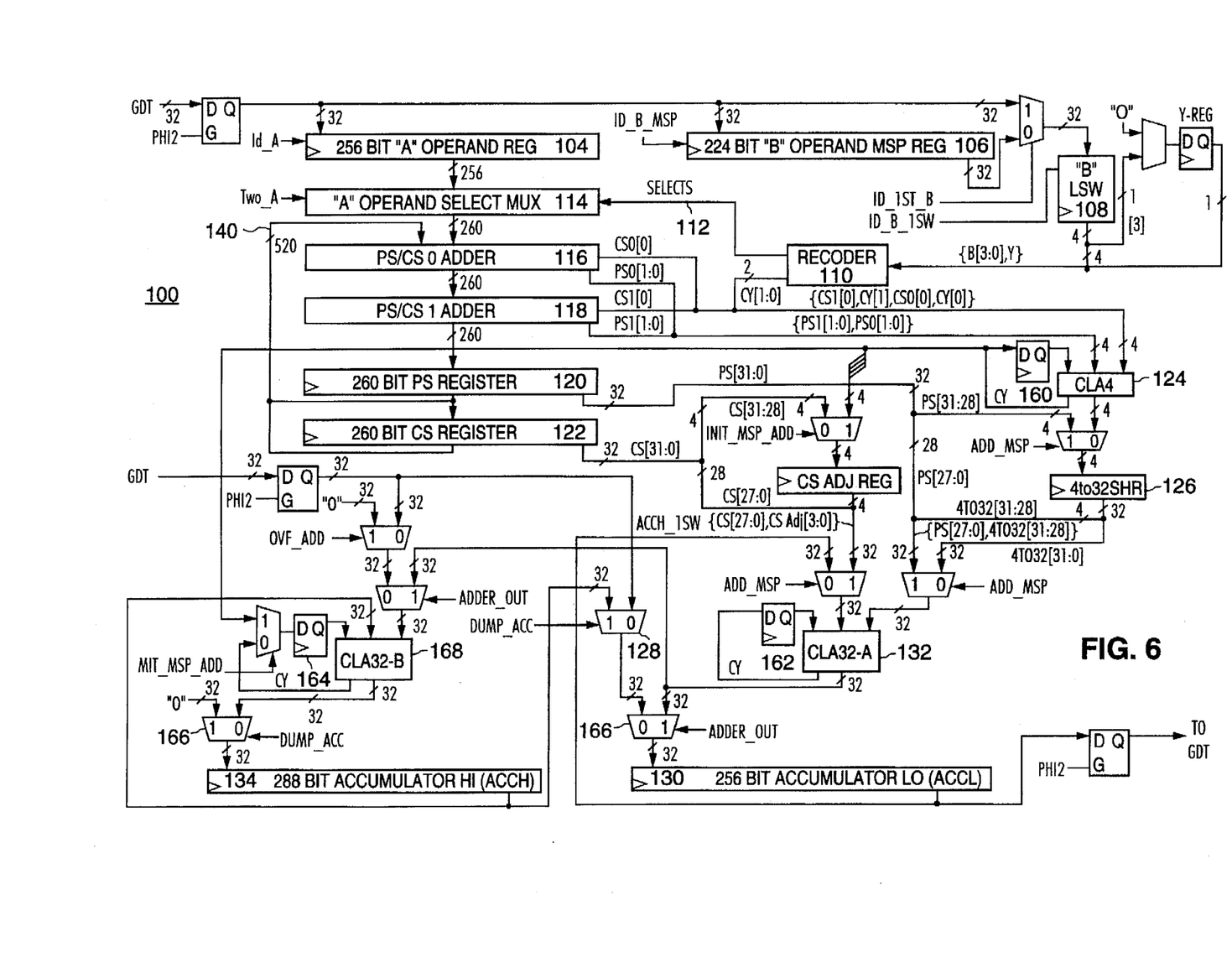
FIG. 6 is a more detailed block diagram of the multiplier unit of the 256 bit by 256 bit Booth Multiplier of the present invention.

FIG. 6 is a more detailed block diagram of multiplier unit 100 of the 256 bit by 256 bit Booth Multiplier of FIG. 3. It is noted that reference numbers common to both FIG. 3 and FIG. 6 refer to the same elements. In addition to the elements of FIG. 3, FIG. 6 shows registers 160, 162, and 164 which are used to store and appropriately weight the carries of carry look ahead adders 124, 132, and 168, respectively. FIG. 6 also shows multiplexers 166 which are used to implement more complex loading and dumping operations for accumulators 130 and 134. Carry look ahead adder 168 is a 32 bit adder which is used to add the product of the multiplication operation to an existing accumulator value.

Registers 160, 162, and 164 are used to accommodate an overflow carry from the look ahead adders. For example, if the look ahead adder has a carry in the fifth bit location, since the present four bits of the sum are to be shifted out, the fifth bit becomes the least significant bit for the next cycle. Therefore, it is input as the carry in bit for the adder.

Multiplexers 166 are used to implement operations such as dumping the lower half of the final product term to the processor data bus and shifting the contents of upper half accumulator 134 to lower half accumulator 130. Multiplexers 166 can also be used to load the entire accumulator (accumulator sections 134 and 130) with a 512 bit value obtained from the processor data bus, to clear accumulators 130 and 134, to dump the contents of the entire accumulator to the processor data bus, or to load data from the processor data bus and add that value to the contents of upper half accumulator 134.

It is noted that carry look ahead adder 132 performs two functions during the Booth recoding and accumulation operations. In the partial product accumulation phase, the 4 bit sections of the product term are pieced together in register 126 until they form a 32 bit word. The equally weighted 32 bit value in lower accumulator 130 is added to the value in register 126 and shifted into accumulator 130. During the PS and CS register addition phase which forms the upper half of the product term, adder is switched to add the contents of the PS and CS registers, 32 bits per cycle. This 32 bit value becomes one input to adder 168, which adds the equally weighted 32 bit value in upper accumulator 134 to the sum of the PS and CS registers. This new sum is then shifted into upper accumulator 134. These steps enable the multiplier to perform the operation A*B+C, where A and B are multiplication operands and C is the contents of the 512 bit accumulator at the beginning of a new multiply cycle.

The Booth recoding method can be performed on signed or unsigned numbers depending upon how the most significant bits of the operands are manipulated. Operand A becomes an unsigned value by including most significant bits having a value of zero. This is why the Booth adder data paths are 260 bits wide instead of 256 bits wide for 256 bit sized operands. Operand B becomes an unsigned value when an extra recode cycle is performed and leading zeros are included in the final recode. This offsets the significance of the product by four bits. This four bit offset can be accommodated by appropriate sequencer retiming and offsetting the data flow.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A multiplier for computing the product of a first operand and a second operand, comprising:

first operand data storage means for loading and storing the first operand;

second operand data storage means for loading and storing the second operand, the second operand storage means including first and second partial operand data storage means for storing a first and a second part of the second operand;

Booth recoding means for forming and accumulating Booth partial products of the first and second operands;

product accumulation means for forming the product of the first and second operands from the accumulated Booth partial products; and control means for shifting the first part of the second operand to the Booth recoding means and enabling the Booth recoding means after loading the first part of the second operand data into the first partial operand data storage means, and prior to completing the loading of the second part of the second operand data into the second partial operand data storage means.

2. The multiplier of claim 1, wherein the control means further comprises:

clock signal generator means for providing a clock signal to enable the first operand data storage means and the first and second partial operand data storage means of the second operand data storage means.

3. A method of computing the product of a first operand and a second operand, comprising:

loading the first operand;

loading a first part of the second operand, wherein the second operand is divided into a first part and a second part;

performing a Booth recoding operation on the first part of the second operand, thereby forming and accumulating Booth partial products of the first and second operands;

loading the second part of the second operand;

performing the Booth recoding operation on the second part of the second operand; and forming the product of the first and second operands from the accumulated Booth partial products.

4. The method of claim 3, wherein the first part of the second operand is loaded into a first second operand storage means and the second part of the second operand is loaded into a second operand storage means, and further, wherein the second part of the second operand is transferred incrementally to the first second operand storage means as the first part of the second operand is recoded.

* * * * *